United States Patent [19]

Houston et al.

[11] 4,281,933

[45] Aug. 4, 1981

[54] APPARATUS FOR SORTING FRUIT ACCORDING TO COLOR

[75] Inventors: Robert K. Houston, Santa Clara; James Meador, Simi Valley, both of Calif.

[73] Assignee: FMC Corporation, San Jose, Calif.

[21] Appl. No.: 113,908

[22] Filed: Jan. 21, 1980

[51] Int. Cl.[3] .............................................. G01N 21/27

[52] U.S. Cl. .................................... 356/425; 209/582; 250/223 R; 250/226; 356/407

[58] Field of Search ........................... 250/223 R, 226; 209/576–582, 552, 558; 356/406, 407, 416, 425

[56] References Cited

U.S. PATENT DOCUMENTS

| | | | |
|---|---|---|---|
| 2,988,219 | 6/1961 | Bartlett | 209/581 X |
| 3,173,017 | 3/1965 | Thayer | 250/226 |
| 3,206,022 | 9/1965 | Roberts, Jr. et al. | 209/582 X |
| 3,750,883 | 8/1973 | Irving et al. | 356/407 X |
| 3,770,111 | 11/1973 | Greenwood et al. | 209/580 |
| 3,776,381 | 12/1973 | Wood | 209/581 X |
| 4,063,816 | 12/1977 | Itoi et al. | 356/425 X |
| 4,106,628 | 8/1978 | Warkentin et al. | 209/580 X |

*Primary Examiner*—F. L. Evans
*Attorney, Agent, or Firm*—R. S. Kelly

[57] ABSTRACT

An apparatus for sorting fruit according to its color comprising a conveyor including a plurality of individual conveyor lines, a first viewer associated with each conveyor line and positioned to observe one side of the fruit carried by the associated conveyor line, a second viewer associated with each conveyor line, said second viewer located downstream from the first viewer and positioned to observe the other side of the fruit carried by the associated conveyor line, and control means. Each viewer produces an electronic signal indicative of the color of the side of the fruit observed. The control means receives the electronic signals as they are produced, storing the signal from the first viewer until the signal from the second viewer is received for a given individual fruit, and evaluates both signals in order to classify the individual fruit according to color. The classifications are stored and available for processing by conventional sorting discharge means not a part of the present invention.

7 Claims, 8 Drawing Figures

FIG_1
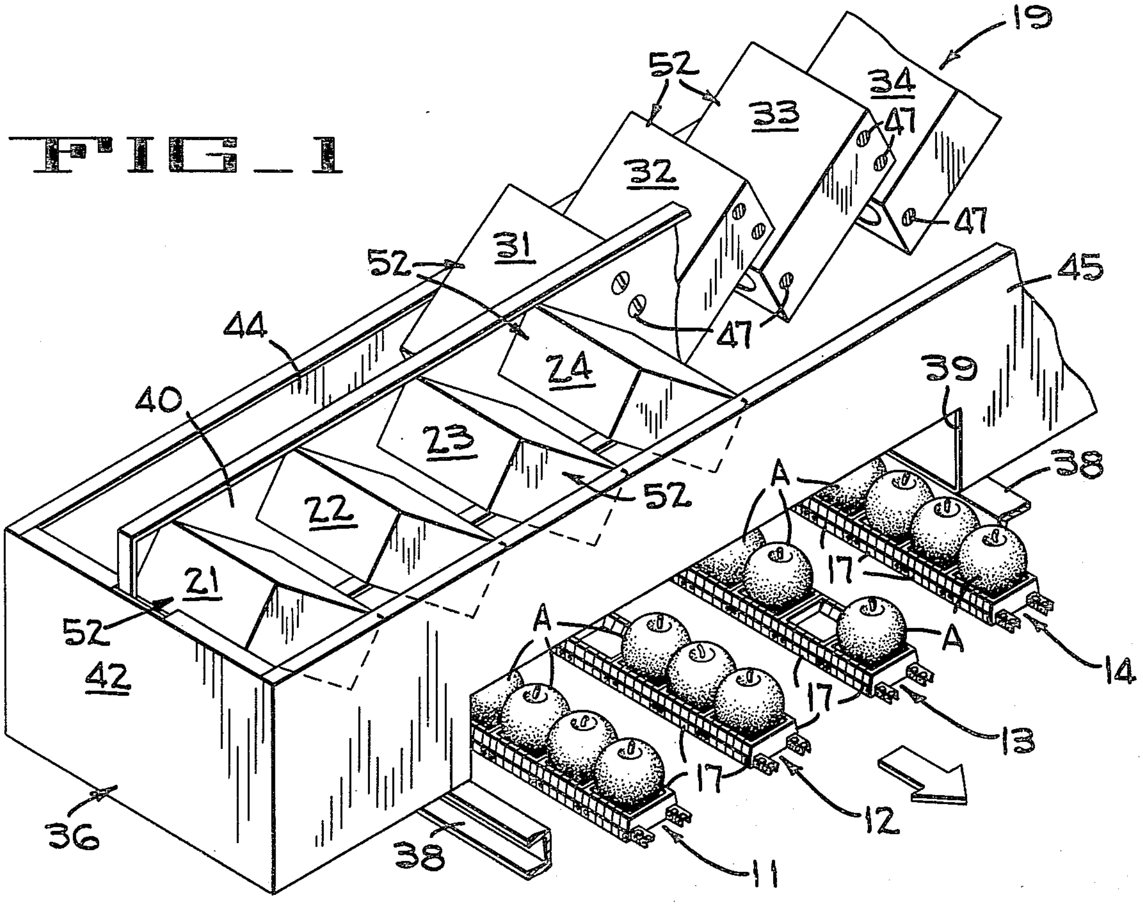
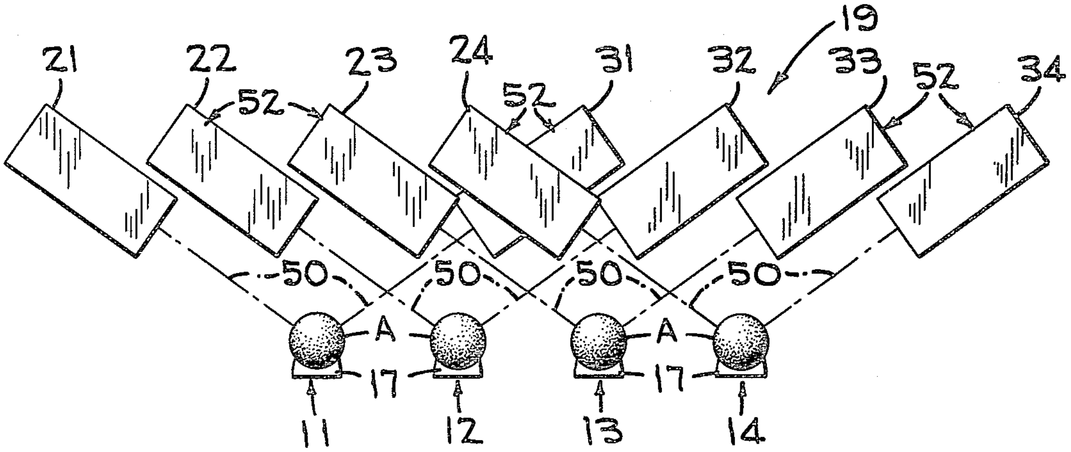
FIG_2

APPARATUS FOR SORTING FRUIT ACCORDING TO COLOR

BACKGROUND OF THE INVENTION

1. Field of the Invention

The present invention generally pertains to apparatus for sorting fruit according to the color thereof, and more particularly, it pertains to apparatus for sorting individual fruit at relatively high speeds so as to make the apparatus adaptable for use in fruit packing house operations.

2. Description of the Prior Art

Fruits and vegetables have long been graded according to the surface color of the fruit which, in turn, relates to the quality of the fruit's interior. This has led to the visual grading of fruit by its color which, being dependent upon the grader's ability to perceive color differences, is influenced by working conditions and is degraded by fatigue. The desirability of electronic-mechanical means for sorting fruit according to color has long been recognized, and various systems, including those described hereinafter, have been proposed.

In quality sorting operations, apples are sorted according to shape, surface blemishes, point defects and degree of bruising as well as according to color. Using these criteria the apple industry presently sorts into four grades: extra fancy, fancy, "C" or commercial, and cull (in descending order of quality). However, most of this quality sorting effort is devoted to sorting as determined by estimating the percentage of apple surface that is the characteristic color of the apple being sorted, e.g., red in the case of Red Delicious Apples or yellow in the case of Yellow Delicious Apples.

Circuitry which has been designed for the sorting of fruits or vegetables generally provides some means for measuring the reflectance properties of the fruit or vegetable being examined. The reflectance of a surface is a measurement of the percentage of incident light reflected by it, and objects of a given color have different reflectances for light of different wavelengths. The relationship between reflectance and the illuminating wavelength for a type of fruit being sorted will produce a characteristic curve which can then be used in the design of apparatus and circuitry for color rating that fruit. That is to say, a fruit may be color classified by suitably measuring, describing, and classifying its reflectance curve, and fruit may be sorted into different grades by denoting the differences between the reflectance curves for the various grades and testing for these differences.

To achieve such a measurement, reflected light centered at two distinct wavelengths is measured. One of the selected wavelength bands will include light at frequencies wherein the variation of reflectance between distinct color grades of the fruit is at a maximum. The other band will comprise wavelengths where there is little or no variation in the reflectance between the different color grades. The determination of the color and individual fruit is then determined by observing the ratio of the values of the reflectance at the two different wavelengths. By using a ratio, the system automatically compensates for variations in factors unrelated to color such as strength of the incident light, size of the fruit, and partial obscuring of the viewing lenses.

The majority of prior art devices have utilized means for conveying the fruit past a color sorting head, the sorting head including means to illuminate the surface of the fruit and photodetectors to detect the intensity of light at various wavelengths reflected from the surface of the fruit. The observed light is split into two fractions centered at two different wavelengths of light, as described in the previous paragraph. The ratio between the intensities of the light received in the different bands is used as an indication of the color value of the fruit. Downstream from the sorting head are located one or more reject mechanisms which divert the selected fruit from the fruit carrying conveyor in accordance with its color value.

A critical factor in the success of any such color sorting apparatus is the design of the color sorting head. The color sorting head must be capable of viewing a substantial portion of the outer surface of each individual fruit and, at the same time, be simple in design so that it is rugged and economical. Various designs have been proposed, as described hereinafter, but none has been wholly successful.

One approach has been to surround the individual fruit with a plurality of light sources as the fruit is passed in front of two mirrors disposed on either side. Light reflected from the surface of the fruit is further reflected by each of the mirrors to a point above the fruit where the light beams are combined by a series of mirrors and lenses into a single beam which is then processed photoelectrically. Such an apparatus is disclosed in the patents issued to Thayer and to Roberts et al, U.S. Pat. Nos. 3,173,017 and 3,206,022, respectively. A second type of color sorting head is disclosed in the patent to Greenwood et al, U.S. Pat. Nos. 3,770,111. There, individual fruit are conveyed through the center of a fiber optic ring which detects light directed onto the fruit by a plurality of light sources and reflected therefrom. By using a fiber optic ring, this color sorting head is able to view substantially all of the surface of the fruit under inspection.

The use of separate sorting heads, each combining means to illuminate the fruit and means to observe the reflected light, to simultaneously view opposite sides of a piece of fruit is disclosed by U.S. Pat. No. 4,106,628 to Warkentin et al.

While the color sorting heads described hereinabove are functional, problems remain with the designs. First, the designs of Thayer, Roberts et al and Greenwood et al are intricate, requiring alignment of a number of mirrors and lenses relative to the frame of the conveyor. Such intricate systems are necessarily costly. A second problem arises in each of the above designs because hardware must be placed all around each fruit as it passes along the supporting conveyor. Placement of the hardware, in turn, requires that individual conveyor lines in multiconveyor systems be widely spaced, a requirement which increases the cost of the final system.

SUMMARY OF THE INVENTION

The present invention solves the aforementioned problems by providing a pair of compact and economical viewers located adjacent to each conveyor line. One side of the individual fruit is scanned by the first viewer at a first point in time. At a later time, the second viewer located on the opposite side of the conveyor line and downstream relative to the first viewer observes the other side of the fruit. Signals from the first and second viewers are electronically processed to produce a signal corresponding to a classification for each individual fruit.

In the preferred embodiment, a number of parallel conveyors are used to move the fruit past a similar number of pairs of viewers. The upstream viewers are located along a straight line transverse to the path of the conveyors. The downstream viewers are similarly arranged in a straight line, but on the opposite side of the conveyor lines. In this way, a minimum space on the conveyor lines is required to accommodate placement of the viewers, i.e., a length of conveyor equal to the width of two viewers. Furthermore, the same length will be required regardless of the number of additional conveyor lines in the system.

BRIEF DESCRIPTION OF THE DRAWINGS

FIG. 1 is an isometric view of the fruit sorting apparatus of the present invention with portions being broken away.

FIG. 2 is a schematic drawing showing the disposition of the individual viewing units above the conveyor lines.

DESCRIPTION OF THE PREFERRED EMBODIMENT

Figure 3:
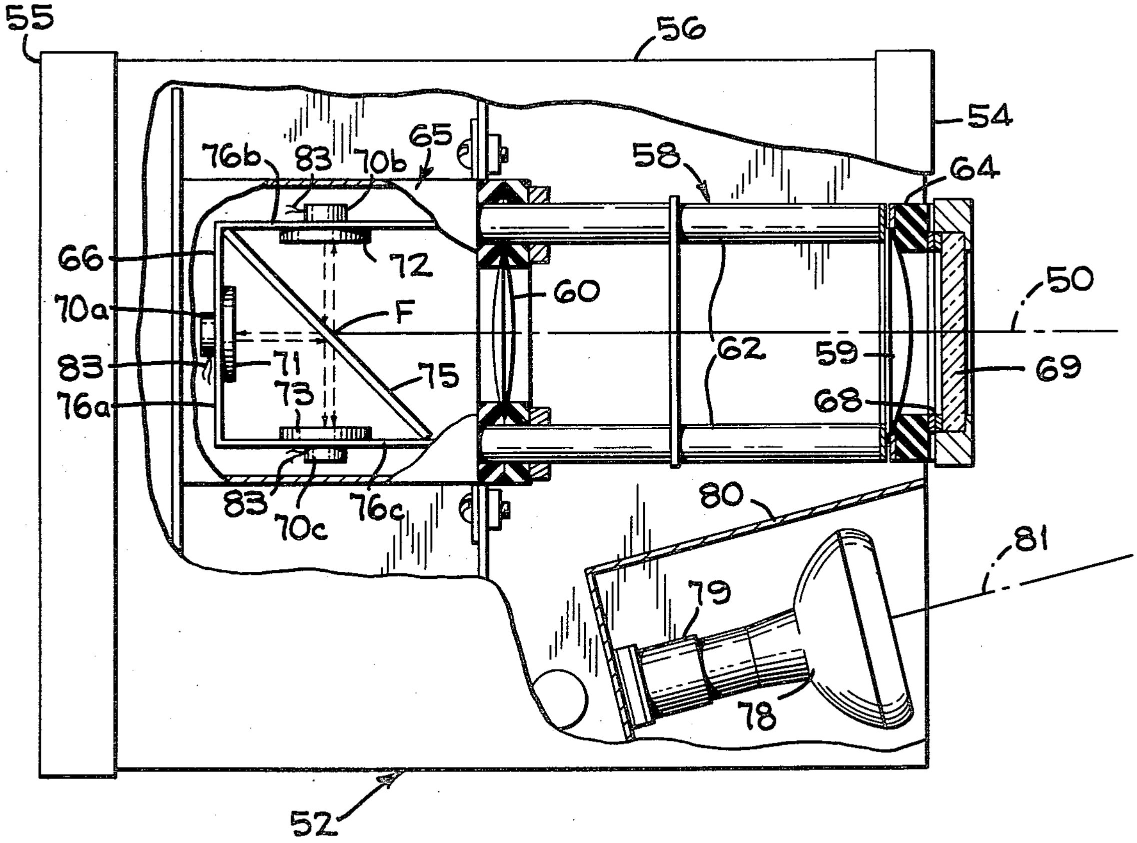
FIG. 3 is a plan of one of the viewers with portions broken away to reveal the internal arrangement.

FIG. 1 illustrates a portion of the front end of a four-channel conveyor which transports fruit, such as apples A, from a source of supply (not shown) to any one of a number of downstream discharge stations (not shown) as it would appear when incorporated with the present invention. The details of construction for such a conveyor are described in the U.S. patent application of Bryan D. Ulch entitled, Weight Sorting Memory Circuit, filed on Nov. 5, 1979, and having Ser. No. 091,322. While the description hereinafter will be based on such a four-channel conveyor, it will be appreciated that the present invention will function equally well with a conveyor of any size and type so long as it is adapted to carry fruit or the like in spaced arrangements in single file paths.

The conveyor of the present invention includes four conveyor belts 11-14 formed of a series of individual cups 17, each cup adapted to support a single piece of fruit in the manner shown in FIG. 1. The conveyor belts are synchronously driven so that adjacent cups 17 are transversely aligned at all times. A means (not shown) is provided to trigger an electronic pulse each time the conveyor belts have moved forward the distance equal to the length of a single cup, such pulses being provided when the cups 17 are centered with respect to the fruit viewing lines as will be explained in greater detail hereinafter. For example, a drive chain encoder may be driven by means of a timing belt which, in turn, is driven by a support shaft for the conveyors. The details of such a timing system are described on page 25 of the aforementioned U.S. patent application of Ulch.

The viewer assembly 19 (FIGS. 1 and 2) includes a total of eight viewers, four front viewers 31 through 34 and four rear viewers 21 through 24, said viewers all being mounted within an enclosure 36. The enclosure 36 is mounted on a pair of U-channels 38 running parallel to the conveyor lines and forming part of the conveyor frame. The enclosure 36 is generally rectangular, having end walls 42 (only one end wall being shown), a front panel 44 and a rear panel 45, with an open top and a partially open bottom. A passageway 39 through the lower portion of the enclosure 36 is provided to allow the apples to pass beneath. A central plate 40 is suspended vertically between the end walls 42 so that the plate is substantially parallel to both the front panel 44 and the rear panel 45 of the enclosure. The viewers 21 through 24 and 31 through 34 are attached to the central plate and arranged generally as shown in FIGS. 1 and 2. Portions of the enclosure 36 are broken away in FIG. 1 to aid in illustrating the mounting of each viewer to the central plate 40. The viewers are attached with three screws 47 (see viewer 33) passing through the central plate and secured in one side wall of the viewer.

Each conveyor 11, 12, 13 or 14 is associated with a pair of viewers 21-24 and 31-34, as shown in FIG. 2. For example, conveyor 11 is associated with viewers 21 and 31, said viewers being symmetrically located on opposite sides of the conveyor line and having viewing lines 50 (FIGS. 2, 3 and 4) corresponding to the axis of the field of vision of that viewer. Each of the remaining conveyor lines 12, 13 and 14 is associated with two additional viewers 22 and 32, 23 and 33, 24 and 34 arranged in an identical spatial relationship. While FIG. 2 illustrates the present invention as applied to a conveyor with four conveyor lines, it can easily be seen that the invention can be expanded to operate with a larger number of conveyors simply by adding additional pairs of viewers for each additional conveyor line.

It will be noted that, in addition to being all located on one side of the respective conveyor lines, the four front viewers 31 through 34 are spaced in front of the four rear viewers 21 through 24 with respect to the direction of travel of the conveyors indicated by the arrow in FIG. 1. The rear viewers 21-24 will be seen to be all located on the opposite side of the respective conveyor lines from the front viewers 31-34. Because of this arrangement, an individual fruit passing down conveyor 11, for example, will be observed by viewer 31 at a time earlier than it is observed by viewer 21. Since the viewing lines 50 of the rear viewers are located precisely three cup lengths apart from the viewing lines 50 of the front viewers, the time of viewing the first side of an apple will be separated from the time of viewing the other side of the apple by the time period required for the conveyor to advance three cup lengths. This time lag is dealt with in calculating the color grade of an individual apple in a manner that will be described hereinafter.

The internal construction of a viewer is shown in FIG. 3. Each viewer comprises an essentially rectangular enclosure 52 having a front face 54, a rear face 55, and two sides 56, one of said sides being adapted to receive the three mounting screws 47, as illustrated in FIG. 1. Three major assemblies are included within the enclosure 52: a lamp 78 for illuminating the fruit as it passes in front of the viewer, a lens assembly 58 for gathering and focusing light reflected from the fruit, and a photosensor assembly 65 for receiving and measuring the focused light.

The lens assembly 58 includes a plano-convex lens 59 and a double convex lens 60, both lenses being rigidly attached to a frame comprising four parallel rods 62. The lens assembly 58 is suspended between the front face 54 of the enclosure 52, where the front of the lens assembly presses against a resilient donut-shaped pad 64, and the photosensor assembly 65 at the rear. Light reflected from the fruit being examined passes through an aperture 68 in the front face of the viewer and is transmitted to point F located substantially at the center of the photosensor assembly 65. The aperture 68 is covered by a plain glass lens 69 in order to prevent foreign matter from damaging the plano-convex lens 59.

The photosensor assembly 65 includes a three-sided enclosure 66; three light filters 71, 72 and 73, each mounted on a side of the enclosure; three photodetectors 70*a*, 70*b* and 70*c*, one located directly behind each of the light filters; and a beam splitter 75 disposed diagonally across the enclosure 66. The three-sided enclosure includes three walls 76*a*, 76*b* and 76*c* which form a U-shaped pattern with the open end disposed toward the aperture 68 in the viewer enclosure 52 so that light may enter. The beam splitter 75, formed of partially mirrored glass, extends from the corner formed by walls 76*a* and 76*b* at the base of the U to the opening of the U adjacent to wall 76*c*. The first light filter 71 and the associated photodetector 70*a* are located on the wall 76*a* forming the base of the U so that the light sensitive surface of the photodetector is disposed inward. The second light filter 72 and associated photodetector 70*b* are located on the wall 76*b* forming one side of the U so that the light sensitive surface of the photodetector is also disposed toward the center of the light tight enclosure. Similarly, the third light filter 73 is located on the remaining wall 76*c* of the three-sided enclosure so that the associated photodetector 70*c* has its light sensitive surface disposed toward the center of the enclosure.

Also included within the viewer enclosure 52 is the lamp 78 mounted in a conventional socket 79. A light barrier 80 prevents light from the lamp 78 from being reflected within the viewer enclosure 52 and entering the photosensor assembly 65 directly. The lamp, which is a conventional incandescent light source, is powered through a transformer and power supply (FIG. 6) remote from the viewer.

Figure 4:
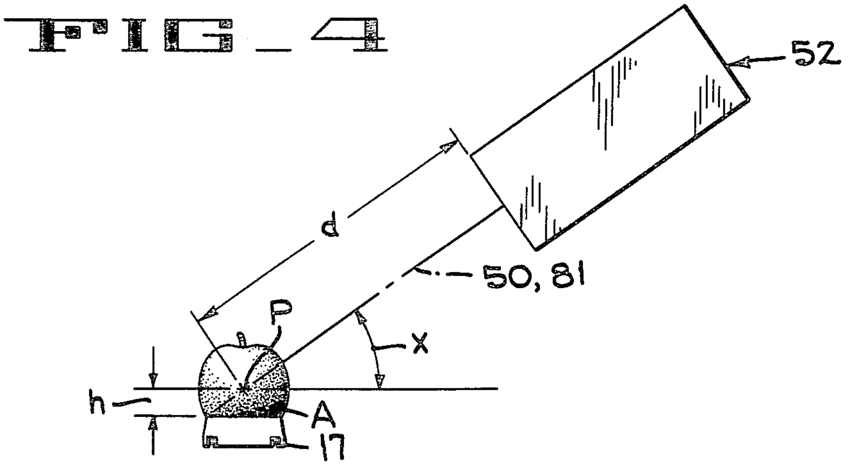
FIG. 4 is a schematic drawing showing the portion of a viewer relative to the apple being viewed.

With reference to FIGS. 1, 2, 3 and 4, operation of the viewer will be explained. Examining any single conveyor line 11–14, it will be seen that two longitudinally displaced viewers are directed at the fruit passing down that line. For example, the fruit on conveyor 11 is first examined on one side thereof by front viewer 31 and then examined on the other side thereof by rear viewer 21, as seen in FIGS. 1 and 2. The front viewers 31 through 34 and the rear viewers 21 through 24 are symmetrically placed in relation to the conveyor lines, as can be seen from FIG. 2. The viewing line 50 is the "line of sight" of the viewer, and each apple will be observed by the viewer as it passes the viewing line. The lamp 78 of a viewer projects a beam with an axis of illumination 81 (FIG. 3), and the axis of illumination intersects the viewing line 50 at a point P (FIG. 4). The distance to the point of intersection P from the front face 54 of the viewer is the length d shown in FIG. 4. The configuration shown in FIG. 4 is typical of all viewers. The point P will be seen to be located a distance h above the center of the cup 17. The point P should correspond approximately to the center of the apple A, and a distance h of 1½ inches has been found satisfactory. In the preferred embodiment, distance d is 11½ inches and angle X is approximately 37°.

When the center of an apple is aligned with the viewing line 50 of a viewer, the surface of the apple is illuminated by the beam emanating from lamp 78, and light reflected from the surface of the apple is received by the viewer through aperture 68. The reflected light passes through the lens assembly 58 and is transmitted to point F in the three-sided enclosure 66. Point F lies approximately at the center of the beam splitter 75, said beam splitter being a partially mirrored glass adapted to transmit 70 percent of incident light and reflect the remaining 30 percent. The exact percentage of transmittance and reflectance depend on the precise wavelength of the incident light; the figures cited, however, are average over the entire range of visible light. The purpose of the beam splitter is to divide the reflected light, in approximately equal proportions, among the three filters 71, 72 and 73 and their associated photodetectors 70*a*, 70*b* and 70*c*. The light striking the beam splitter 75 at F is partly reflected to filter 72 and partly transmitted to filter 71. All three filters used in the present invention are band pass filters which reflect undesired frequencies of light as would a mirror. Thus, the light which has passed through the beam splitter and landed on the filter 71 is largely reflected back from said filter in the opposite direction. This reflected light again strikes the beam splitter where 30 percent is reflected toward filter 73 and the remainder is transmitted through the beam splitter and lost from the three-sided enclosure 66. Light reflected from filter 72 also reaches filter 73 since the majority is transmitted directly through beam splitter 75. In this manner, each photodetector receives adequate amounts of light of the appropriate frequency. Any difference in the amount of incident light striking the different filters may be compensated for by adjusting the gain on an amplifier associated with the output signal of each photodetector.

The photodetectors 70*a*, 70*b* and 70*c* are of the conventional type which respond to incident light of all frequencies and provide a voltage output corresponding to the intensity of the incident light. Since filters are placed in the path of the incident light, each photodetector sees light in a preselected band of wavelengths only. Filter 71 passes light in a narrow band of wavelengths centered at 590 nanometers. Filter 72 passes light in a narrow band of wavelengths centered at 670 nanometers. Filter 73 passes light in a narrow band of wavelengths centered at 825 nanometers. The output of photodetector 70*a*, thus, corresponds to the intensity of light centered at 590 nanometers found in the light reflected from the apple. The output of photodetector 70*b* corresponds to reflected light at 670 nanometers, and the output of photodetector 70*c* corresponds to reflected light at 825 nanometers. These outputs are transmitted from the viewers by leads 83 which are connected to a CPU controller (FIG. 5) and are processed in a manner described hereinafter.

Figure 5:
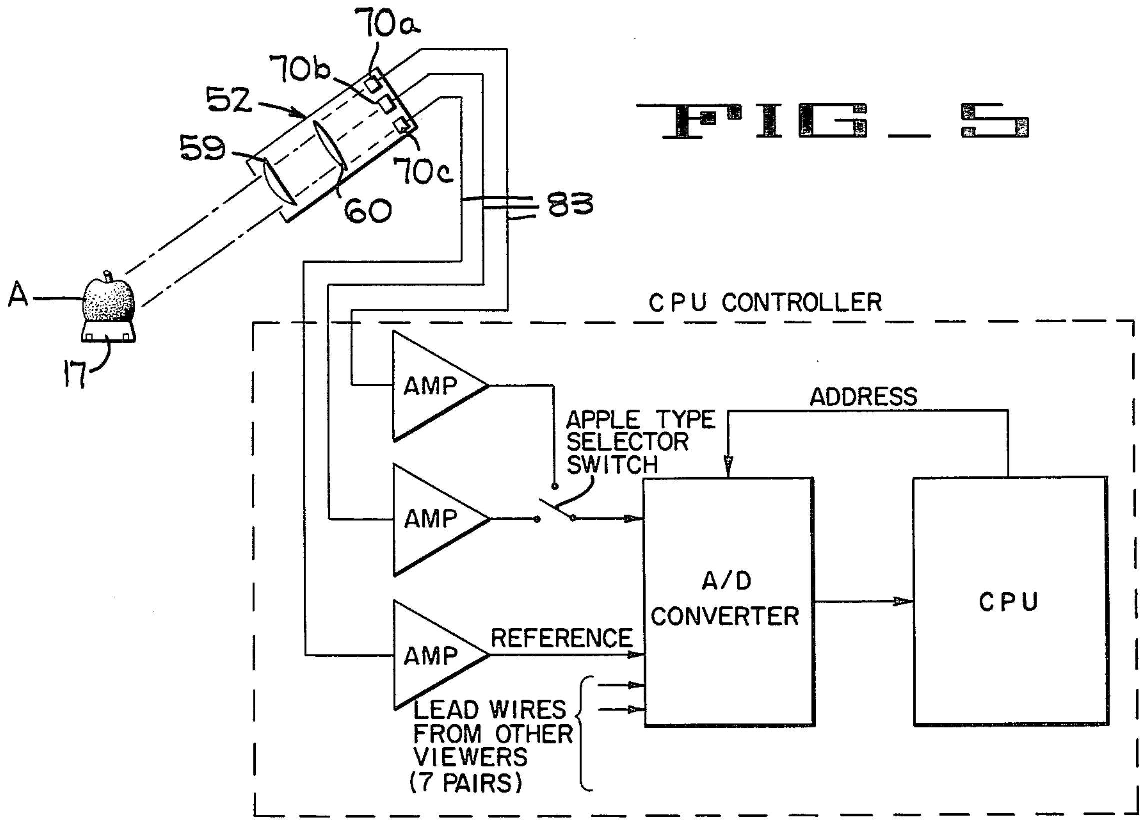
FIG. 5 is a block diagram representing the circuitry of the present invention.

The circuitry used to process the information generated by each viewer is illustrated in the block diagram of FIG. 5. The output of each photodetector 70*a*, 70*b* and 70*c* associated with each viewer 21 through 24 and 31 through 34 is directed to a dedicated amplifier (AMP) in the central processing unit (CPU) circuitry where it is converted to a high level voltage signal. The high level signal corresponding to the light intensity in the 825 nanometer range for each viewer is wired directly to a multiplexing analog-to-digital (A/D) converter where it serves as a reference (or normalizing) voltage. The reference voltage is divided into the input voltage to provide the appropriate analog signal levels for the digital conversion in the A/D converter disclosed. The high level signals corresponding to light at 590 and 670 nanometers are routed to a selector switch where the user selects which of these signals is to be processed. If red-green apples are being sorted, the 590 nanometer signal is sent to the converter. The 670 nanometer signal is used for sorting yellow-green apples. The selected signal is then available for processing by the A/D converter. The A/D converter is capable of multiplexing eight input signals where each input consists of an analog signal (either 590 or 670 nanometers) and a reference signal (825 nanometers). By inputting the analog output of the infrared detector 70*c* as the reference signal and inputting the output of the visible light detector 70*a* or 70*b* as the analog signal wherein the analog signal is divided by the reference signal prior to digital conversion, the output of the A/D converter is a digital signal corresponding to the ratio between the intensity of reflected visible light and the intensity of reflected infrared light. All eight viewers 21–24, 31–34 are wired to the A/D converter in a similar manner so that a total of 16 leads enter the converter. The converter includes a multiplexing function and is capable of producing a digital output corresponding to the light ratio observed by any of the eight viewers only one at a time. The choice of which channel is to be converted (i.e., which viewer's signals are to be processed) is determined by a CPU, or microprocessor, which produces the digital input marked ADDRESS (FIG. 5) to control the operation of the A/D converter.

The ratio between the visible light signal and the infrared signal is used to normalize the resulting color signal and reduce variations caused by differences in the sizes of apples, dust on the plain glass lens 69, and other factors which affect the total amount of light entering the viewer and which would affect the results if only the difference in the light signal levels were considered. It has been found that the intensity of infrared light reflected from an apple, or any other object, does not depend on the visible color of the apple. Thus, The ratio between the reflected visible light at a particular wavelength and the reflected infrared light is an indication of the relative amount of a color of the apple. In sorting red apples from red-green apples, the ratio of the 590 nanometer light over the 825 nanometer light (infrared) is used. A decrease in this ratio indicates an increase in the red color of the apple. In sorting yellow apples from yellow-green apples, the ratio of the 670 nanometer light over the 825 nanometer light is used. An increase in this ratio indicates more yellow in the apple. The particular color sorting scheme as just described is conventional and for a further description of its operation and its utility in sorting apples, reference is made to U.S. Pat. No. 3,750,883 to Irving et al.

Figure 6:
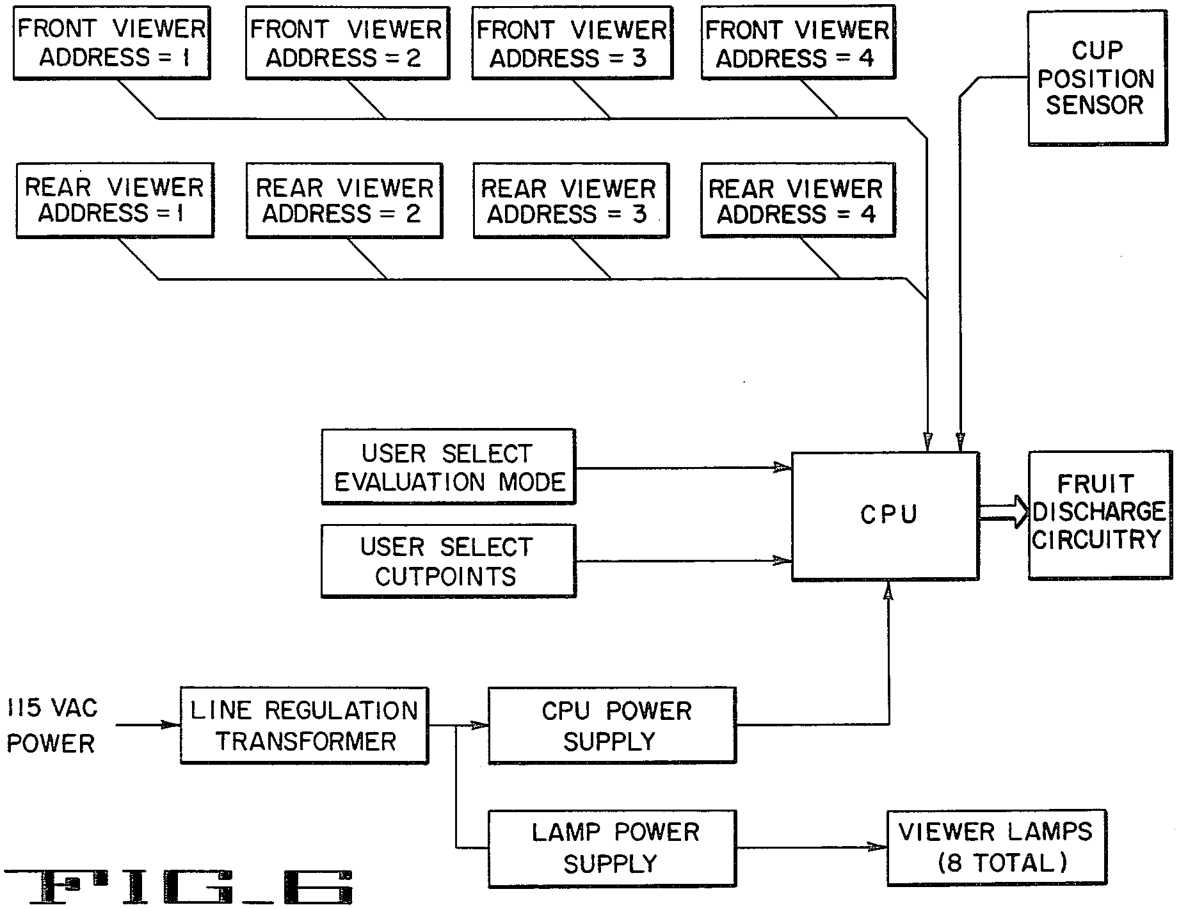
FIG. 6 is a block diagram representing the information flow of the present invention.

The heart of the processing system of the present invention lies in the CPU which sequentially receives the digital color information from the A/D converter. The CPU is entirely conventional and includes a microprocessor, associated memory to allow information to be stored and processed as described hereinafter, and appropriate interfacing circuitry. There are a total of 12 inputs to the CPU, 11 informational inputs (8 being on the common viewer address line) and 1 power input as shown in FIG. 6. The CPU receives color information from the eight viewers serially by sequentially sending the desired addresses to the A/D converter. The CPU also receives an indication from the cup position sensor each time the conveyor cups 17 have moved forward a distance equal to the precise length of a single cup and the centers of the cups are aligned with the viewing lines 50 (FIGS. 3 and 4) as previously explained. The CPU also receives an Evaluation Mode selection from the user which will determine the way that the color information will be processed as will be explained in detail hereinafter. The user also inputs cutpoints direct to the CPU to determine to which class an apple of a given amount of the characteristic color will be assigned. The CPU of the present invention will accept three cutpoints delineating the four color classes previously mentioned for color sorting apples. Finally, the CPU controller circuitry (FIG. 5) receives an input from the user to activate the various selector switches, i.e., to actuate the selector switches (FIG. 5) to the A/D converter to select whether the output of photodetectors 70*a* (for sorting red apples) or the output of photodetectors 70*b* (for sorting yellow apples) will be routed to the A/D converter.

The "output" of the CPU is a matrix array in a random access memory which stores information corresponding to the color classification of each apple which has passed beneath both the front and rear viewers. The matrix will contain four columns corresponding to the four conveyor lines 11–14. The number of rows in the matrix will depend on how the information will be used. For example, a 4×10 matrix might be used if a sorting operation is carried out at the ninth line of cups following the rear viewers 21 through 24. A matrix of that dimension would be sufficient to store classification data on all apples from the time the classification is determined (as described hereinafter) until the time the classifications are used in the sorting application. In any event, the classification information is stored in a memory which will track the apples as they are moved by the conveyor lines, and such information will be available to other microprocessors (not part of the present invention) for whatever type of sorting operation is desired or such information can be scanned and utilized to selectively actuate apple removal devices (not shown) at the appropriate points in the conveyor lines. This storate matrix array is designated the Tracking Matrix since, as described hereinafter, it "tracks" individual apples as they proceed down the conveyors.

Figure 7A:
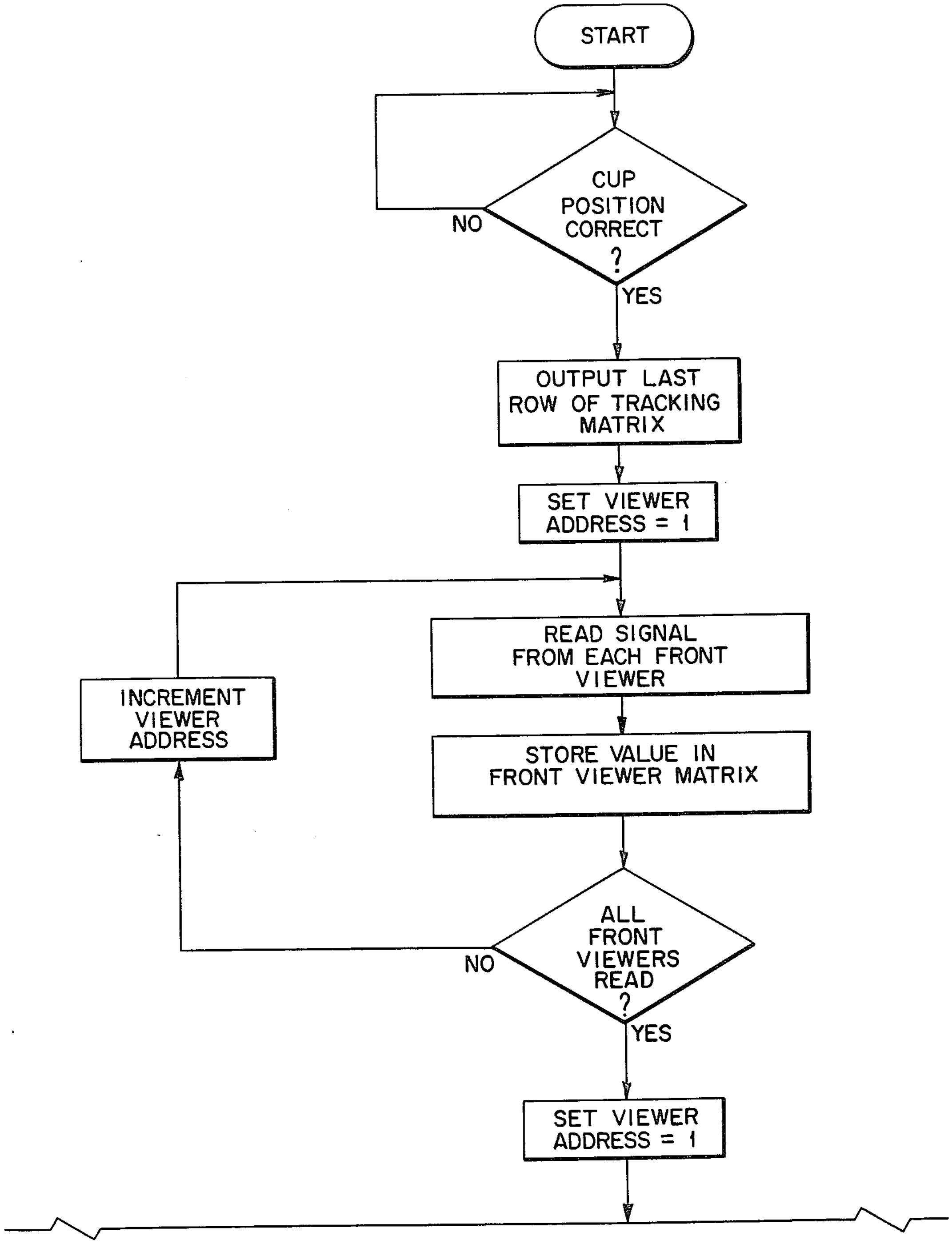
FIGS. 7A and 7B are a flow chart illustrating the programming of the CPU of the present invention.
Figure 7B:
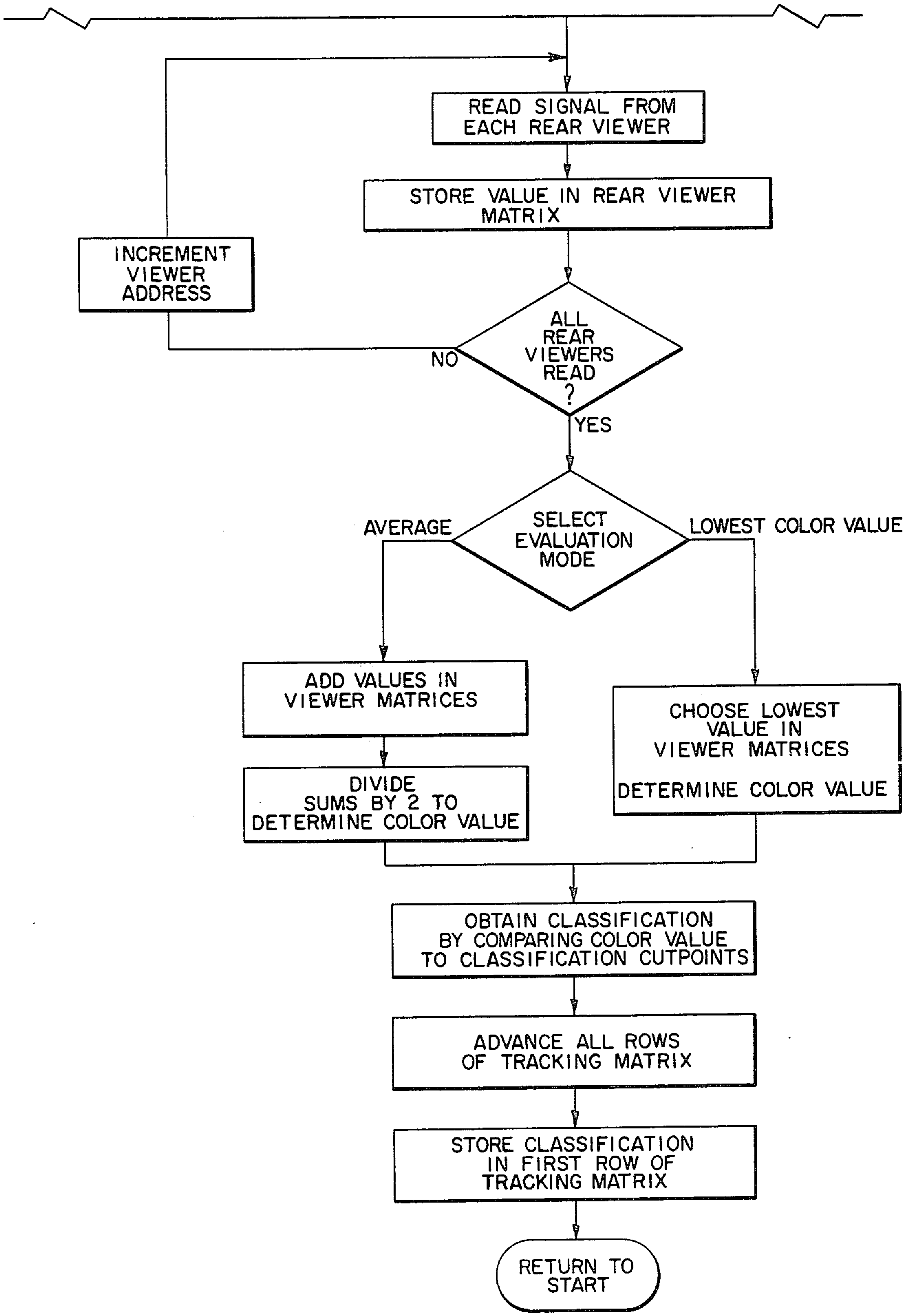

FIGS. 7A and 7B represent a flow chart of the logic programmed into the microprocessor of the CPU. The programmed logic sequence begins when a pulse is received from the cup position sensor, indicating that the apples A carried by the conveyors 11–14 are in a proper position for viewing by the viewers 21–24 and 31–34. When this signal is received, a discharge signal is first sent to the appropriate discharging mechanisms or to further control circuitry indicating that the time is appropriate to discharge one or more apples or to transfer the information contained in a preselected row of the Tracking Matrix. It should be noted that the further control circuitry could read the contents of the entire Tracking Matrix, or any part thereof, without any change to the present invention. For the purposes of illustration, however, it will be assumed that color information on the apples in the last row of the conveyors 11–14 being tracked (as indicated by the last row in the Tracking Matrix) is desired and that the further control circuitry will process this information approximately to insure the appropriate sorting of the apples. While the discharging of the apples is not part of the present invention the sorter of the present invention can be utilized with the sorting apparatus shown in the aforementioned U.S. patent application of Ulch, Ser. No. 091,322.

After the aforedescribed discharge information is output, the viewer ADDRESS to the A/D converter is set at 1. The CPU microprocessor then reads the signal from the first front viewer 31 and stores that information in the first column, first row position of a 4×4 matrix called the Front Viewer Matrix. The viewer ADDRESS is then incremented and all the front viewers 32, 33 and 34 are read in turn with the information being stored in the remaining columns of the first row in the Front Viewer Matrix. After examining all front viewers, the viewer ADDRESS is reset to 1 and the first rear viewer 21 is examined. The information obtained from the first rear viewer is stored in the first column of a 4×1 matrix called the Rear Viewer Matrix. The viewer ADDRESS is then incremented and each of the rear viewers is examined in turn, with the information being stored in the appropriate column of the Rear Viewer Matrix. It should be remembered that the apples observed by the front viewers are three cup lengths in front (with reference to the arrow of FIG. 1) of the apples observed by the rear viewers, i.e., on any given conveyor there are two cups 17 between the cups 17 which are being viewed by the associated front and rear viewers. The reason the Front Viewer Matrix is larger than the Rear Viewer Matrix is that the color information relating to the first side of an apple must be stored until the other side of the apple is viewed and the color information obtained. As additional rows of apples are observed by the front viewers, the information in the Front Viewer Matrix is advanced one row at a time. Since there are three cup lengths between the front and rear viewers, the color information relating to the first viewed sides of a row of apples then being observed by the rear viewers is found in the fourth row of the Front Viewer Matrix; hence a 4×4 matrix is required for the Front Viewer Matrix.

Once the rear viewers 21 through 24 have been read and the color information stored, the CPU possesses sufficient information to calculate a color value for each of the four apples then beneath the rear viewers. This is done in either of two ways, with the desired Evaluation Mode being switched into the CPU by the user. First, an average color value may be calculated by adding the values in the Rear Viewer Matrix to the values at the corresponding column in the last row of the Front Viewer Matrix. The resulting sums are divided by two and the quotient represents the average color value of the two sides of the apple. Alternatively, the CPU may be programmed to compare the color values of the separate sides of the apple, select the lowest color value, and denominate that value (or, alternatively the highest color value) the color value for the whole apple. In either case, a numerical color value is obtained for each of the apples then beneath the rear viewers.

To classify the apples into the four color classifications, the just determined color value for each apple then beneath the rear viewers is compared against the cutpoints dialed into the CPU by the user. The information then in the Tracking Matrix is then advanced one row (with information in the last row being lost), and the newly obtained classifications are stored in the now-empty first row of the Tracking Matrix. At this time, the Rear Viewer Matrix can be cleared and the Front Viewer Matrix can have the information therein advanced by one row so as to set up these matrices for the subsequent grading cycle. The information in the first row of the Tracking Matrix will advance through the Tracking Matrix by one row each time a physical row of apples advances one cup length on the conveyor. The information in the Tracking Matrix, while available for various purposes, as aforedescribed, would typically be used by the control microprocessor of a sorting discharge conveyor. As previously pointed out, such a microprocessor-controlled discharge conveyor is fully described in the copending U.S. patent application of Ulch, Ser. No. 091,322 filed on Nov. 5, 1979. Although not a part of the present invention, the sorting discharge conveyor of Ulch will be briefly described to illustrate how information in the Tracking Matrix of the present invention might be used.

The discharge conveyor described by Ulch is controlled by a microprocessor capable of evaluating weight information gathered as the apples proceed down the conveyor. It can be appreciated that this microprocessor could be reprogrammed by one skilled in the art to also consider color information when making final decisions as to where a particular applie with be dropped, i.e., at what point along the discharge conveyor it will be dropped. The microprocessor controlling the discharge conveyor would obtain color information from the Tracking Matrix of the present invention. This information could be transferred at any time after the color calculations are made and stored in the Tracking Matrix and typically would occur as the apples are discharged from the support conveyors 11–14 of the present invention onto the sorting discharge conveyor (not shown). The number of rows in the Tracking Matrix would correspond to the number of rows in the support conveyor after the rear viewers. Thus, the information in the last row of the Tracking Matrix would pertain to the apples then being transferred to the sorting discharge conveyor. After that, the microprocessor of the discharge conveyor could keep track of the color information as well as the weight information in the manner described in the patent application of Ulch.

Although the best mode contemplated for carrying out the present invention has been herein shown and described, it will be apparent that modification and variation may be made without departing from what is regarded to be the subject matter of the invention.

What is claimed is:

1. Apparatus for sorting fruit according to color, comprising:

a conveyor for moving the fruit down a path in single file;

means for viewing the fruit to determine the color thereof comprising an upstream viewer and a downstream viewer, said viewers being positioned adjacent to said path with the upstream viewer being positioned on one side of the path and with the downstream viewer being positioned on the other side of the path, said viewers being spaced in the direction of movement of said conveyor along said path so that the upstream viewer observes a first side of an individual fruit at an earlier time than the downstream viewer observes the opposite side of the same fruit;

at least one light source positioned to illuminate said first side of the fruit as the fruit passes by the upstream viewer and at least one light source positioned to illuminate the opposite side of the fruit as the fruit passes the downstream viewer;

photosensor means in each viewer for receiving light reflected from one side of an individual fruit as said fruit passes in front of each viewer and for providing an output signal indicative of the color of said fruit, and control means for receiving the signal from the upstream viewer when it is viewing said individual fruit, storing said signal until the individual fruit reaches the downstream viewer, receiving the signal from the downstream one of the viewers for said individual fruit and comparing both of said signals to determine the color of said fruit.

2. An apparatus as in claim 1, wherein the photosensor means includes three photodetectors, the first photodetector capable of detecting infrared light, the second photodetector capable of detecting light comprising a band of wavelengths centered substantially about 590 nanometers, and the third photodetector capable of detecting light comprising a band of wavelengths centered substantially about 670 nanometers.

3. An apparatus as in claim 1, wherein the control means computes the average of the signal from the upstream viewer and the signal from the downstream viewer and, based on said average, assigns the individual fruit to one of a plurality of preselected classification.

4. An apparatus as in claim 1, wherein the control means selected either the highest value signal or the lowest value signal from between the upstream signal and the downstream signal and, based on said selected signal, assigns the individual fruit to one of a plurality of preselected classification.

5. For use with an apparatus for sorting fruit according to color, said apparatus including means for conveying individual fruit down a plurality of paths in single file and means for selectively discharging said fruit according to a color classification scheme, a device for classifying individual fruit according to color, said device comprising:

a pair of viewers mounted above each of said plurality of paths, the first viewer of each pair being located on one side of the associated path and the second viewer of each pair being located on the other side of the path with all of the first viewers being transversely aligned with respect to the paths at a first location and all the second viewers being transversely aligned with respect to the paths at a second location downstream from the first location with respect to the direction of movement of the fruit;

a light source mounted together with each viewer and positioned to illuminate one side of the individual fruit as it passes by said viewer;

photosensor means mounted within each viewer for receiving light reflected from the side of an individual fruit that directly faces said viewer as said fruit passes in front of each viewer and for providing an output signal indicative of the color of said fruit, said photosensor means including at least two photodetectors, each of said photodetectors capable of detecting light of a different wavelength; and control means for receiving the output signal from the first viewer associated with an individual fruit, storing said signal until the individual fruit reaches the second viewer, receiving the signal from the second viewer, and computing a classification for the individual fruit based on both output signals.

6. A device as in claim 5, wherein the control means computes the average of the signal from the upstream viewer and the signal from the downstream viewer and, based on said average, assigns the individual fruit to one of a plurality of preselected classification.

7. A device as in claim 5, wherein the control means selects either the highest value signal or the lowest value signal from between the upstream signal and the downstream signal and, based on said selected signal, assigns the individual fruit to one of a plurality of preselected classification.

* * * * *